United States Patent [19]

Devchoudhury

[11] 4,384,326
[45] May 17, 1983

[54] MEMORY SECURITY CIRCUIT USING THE SIMULTANEOUS OCCURANCE OF TWO SIGNALS TO ENABLE THE MEMORY

[75] Inventor: Rathindra N. Devchoudhury, Ithaca, N.Y.

[73] Assignee: NCR Corporation, Dayton, Ohio

[21] Appl. No.: 172,581

[22] Filed: Jul. 28, 1980

[51] Int. Cl.³ .............................................. G06F 13/00
[52] U.S. Cl. ................................................... 364/200
[58] Field of Search ... 364/200 MS File, 900 MS File

[56] References Cited
U.S. PATENT DOCUMENTS 3,736,569  5/1973  Bouricius et al. ................... 364/200
4,089,052  5/1978  Gruner .............................. 364/200

*Primary Examiner*—Raulfe B. Zache
*Attorney, Agent, or Firm*—J. T. Cavender; Wilbert Hawk, Jr.; Richard W. Lavin

[57] ABSTRACT

A control circuit to disable the operation of a semiconductor microprocessor memory device in event of an unauthorized attempt to access the memory. The memory device is disabled from operation upon removal of the device from the microprocessor. A delayed signal generated outside the memory device enables the control circuit to generate a memory enabling signal. Logic circuit means including a counter generates a signal for a preselected time period during which the delayed signal is required to be generated. Both signals control the enabling of the memory device.

14 Claims, 5 Drawing Figures

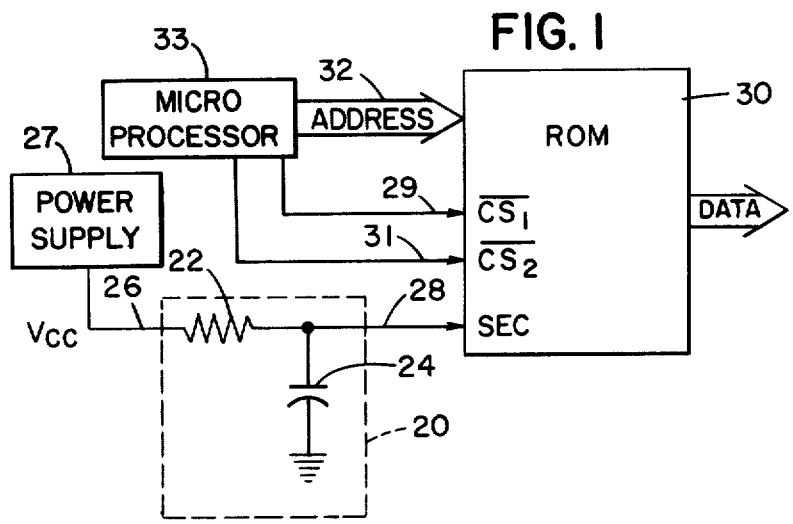
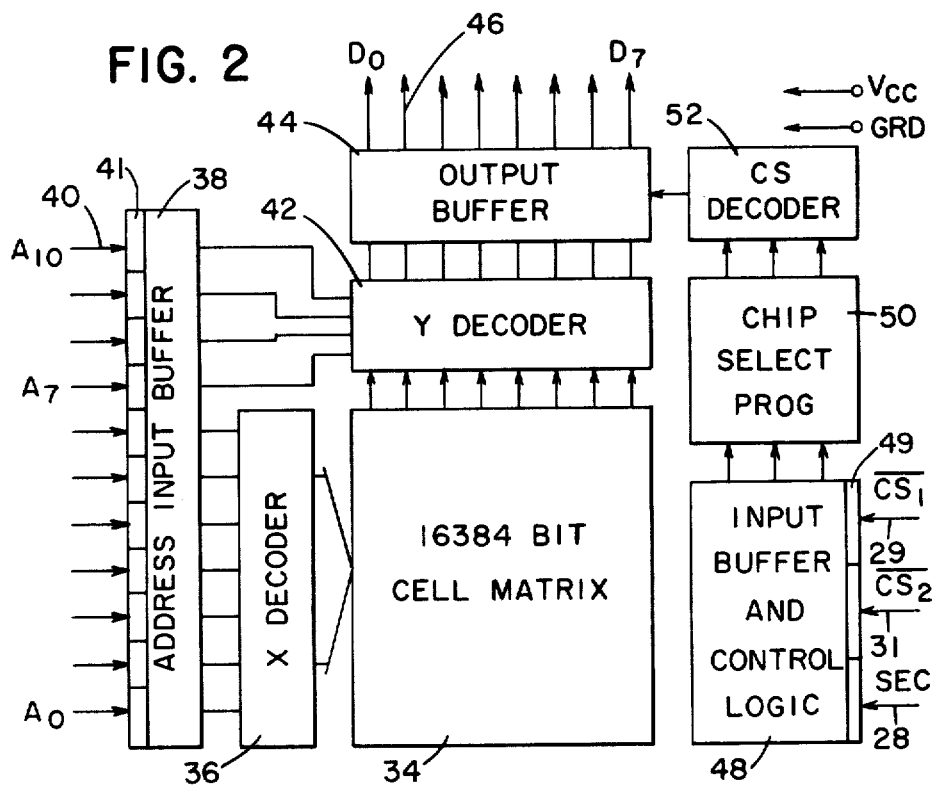

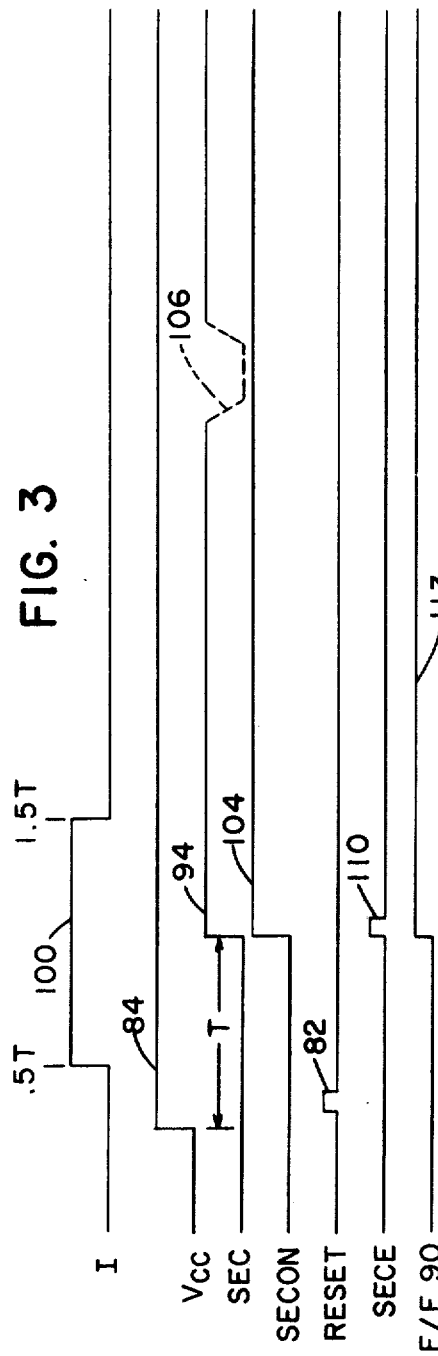
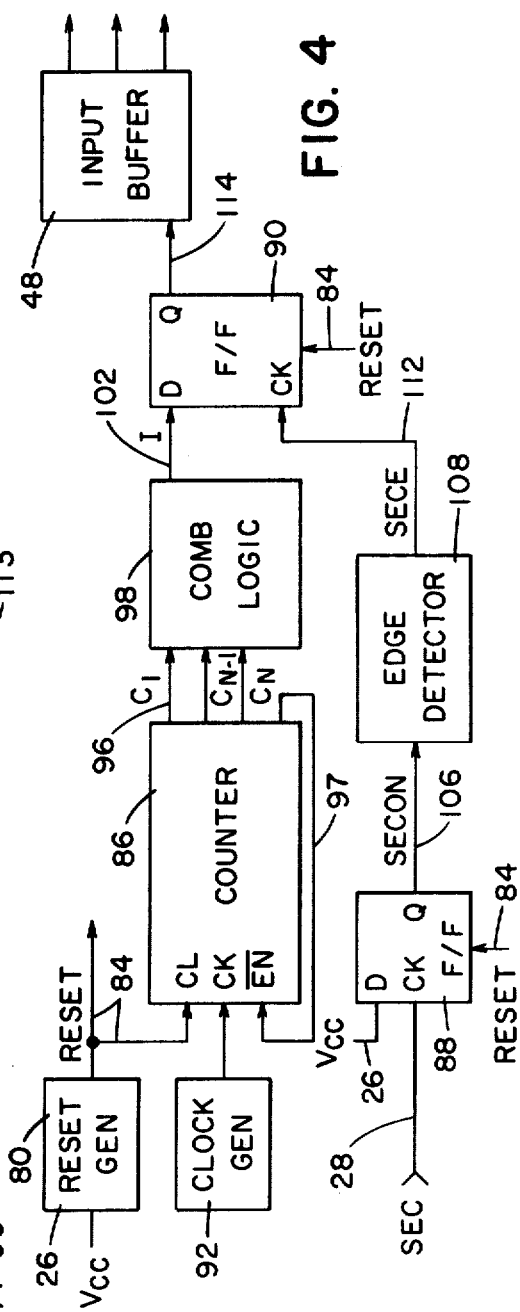

4,384,326

MEMORY SECURITY CIRCUIT USING THE SIMULTANEOUS OCCURANCE OF TWO SIGNALS TO ENABLE THE MEMORY

BACKGROUND OF THE INVENTION

The present invention relates to a unique security control circuit for preventing the unauthorized use of a semiconductor memory incorporated within a microprocessor unit. Presently there is a need to protect programs and data stored in memory devices found in terminals and other data processing equipment from being read by unauthorized persons. With increasing emphasis directed towards software programs, the need to protect such programs also increases. Once a program or other data has been stored in a memory device associated with a widely-used microprocessor, it is very easy for one to remove the memory device and copy the program from the memory device using a similar microprocessor. Thus, it is the primary object of this invention to provide a circuit to prevent the unauthorized removal of information stored in a memory device. It is a further object of this invention to provide such a circuit which is simple in construction and low in cost.

SUMMARY OF THE INVENTION

In order to fulfill these objects, there is disclosed a semiconductor memory control circuit which includes a delay network coupled to a chip select input line of a read-only memory (ROM) unit. After a power-up condition has occurred, a predetermined time delay must occur from the time the chip power supply goes high to when the selected chip select input line goes high before the ROM will enter a normal mode, wherein an access operation can occur. If the specified time delay does not occur, the ROM goes into an inaccessible state and will not enable its output lines. In one embodiment of the invention, an RC network is employed to generate the delay. Logic circuitry associated with the ROM unit and the delay network includes a counter whose output count selects a time period during which a control signal must be generated after power has been applied to the memory unit in order for the memory unit to be enabled to carry out memory access operations.

BRIEF DESCRIPTION OF THE DRAWINGS

Additional advantages and features of the present invention will become apparent and fully understood from a reading of the following description taken together with the annexed drawings.

FIG. 1 is a block diagram of a portion of the control circuit showing the delay network associated with the ROM memory unit;

FIG. 2 is a block diagram of a standard ROM memory unit showing the connection of the input line over which the security select signal SEC is transmitted to the memory unit;

FIG. 3 is a diagram showing various control pulses used in the control circuit for controlling the operation of the ROM memory unit;

FIG. 4 is a block diagram of the control logic portion of the control circuit for controlling the enabling of the ROM memory unit in response to the generation of the delayed supply voltage signal.

DESCRIPTION OF THE PREFERRED EMBODIMENT

Figure 5:
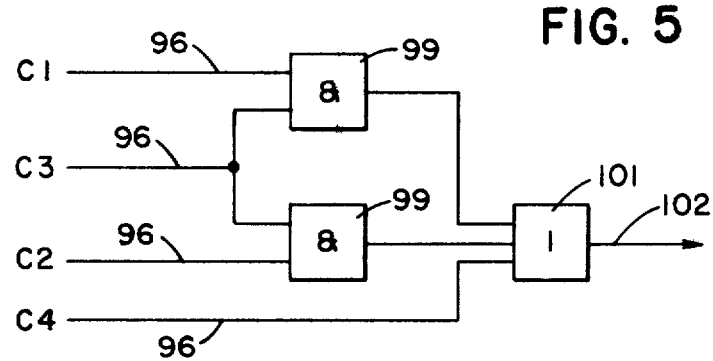
FIG. 5 is a block diagram of the combination logic circuit used in controlling the operation of the ROM memory unit.

Referring now to FIG. 1 there is shown a block diagram of a portion of the security control circuit for controlling the operation of a semiconductor memory unit. Included in the circuit is a delay network 20 comprising a resistor 22 and a capacitor 24 forming a well-known RC circuit which outputs a voltage signal after a predetermined time delay as a result of the charging of the capacitor in a manner that is well-known in the art. One end of the resistor 22 is connected over line 26 to a conventional power supply 27 on which appears the supply voltage signal $V_{cc}$ which, in the present embodiment, is five volts. After a time delay during which the capacitor 24 is charged, the delayed five volt signal $V_{cc}$ (now labeled the security check signal SEC) is transmitted over line 28 to one of a number of chip select inputs labeled SEC of a ROM memory unit 30 which also receives over bus 32 from the microprocessor 33 the address of the data to be accessed in addition to the chip selection signals $\overline{CS_1}$ and $\overline{CS_2}$ transmitted over lines 29 and 31 respectively. The ROM unit 30 is of conventional construction as shown in FIG. 2. An example of a ROM unit that is presently commercially available is the Intel 2316E manufactured by the Intel Corporation of Santa Clara, Calif. Included in the memory unit 30 is a 16384 bit cell matrix 34 to which is coupled a decoder 36 which decodes the address bits $A_0$–$A_7$ received from the address input buffer 38. The address bits $A_8$–$A_{10}$ transmitted over lines 40 are inputted into the input ports 41 of a decoder 42 which decodes the data read out of the matrix 34. The decoded data bits $D_0$–$D_7$ are outputted to the output buffer 44 for transmission over lines 46 to a receiving unit.

Also included in the ROM memory unit 30 is an input buffer and control logic unit 48 which receives the chip select signals $\overline{CS_1}$ and $\overline{CS_2}$ at the input ports 49 in addition to the delayed security check signal SEC transmitted over line 28 (FIG. 1) from the delay network 20. The signals $\overline{CS_1}$, $\overline{CS_2}$ and SEC are transmitted to a chip select program unit 50 which selects the chips to be accessed in accordance with a program stored in the unit. The chip select signals outputted from the program unit 50 are transferred to a chip select decoder 52 which controls the enabling of the output buffer 44 to output the required data over lines 46 to the receiving unit.

Referring now to FIG. 4, there is shown a block diagram of the control logic circuit located in the input buffer unit 48 (FIG. 2) of the ROM memory unit 30 which, in conjunction with the delay network 20 controls the enabling of the memory unit 30 in accordance with the generation of the security check signal SEC. Included in the logic circuit is a reset generator 80 comprising an edge detector circuit which generates a reset pulse 82 (FIG. 3) when the supply voltage signal $V_{cc}$ appearing on line 26 and indicated by the numeral 84 in FIG. 3 goes high. The reset pulse 82 is transmitted over the line 84 to a binary counter 86 and, to a pair of D-type flip-flops 88, 90 thereby clearing the counter and resetting the flip-flops.

Also included in the control circuit is a clock generator 92 which clocks the counter 86 at a predetermined frequency in a manner that is well known in the art. The counter 86 also receives over line 97 the signal of the most significant bit of the output count of the counter 86, which signal is connected to the enabling input $\overline{EN}$ of the counter preventing the counter from counting multiple cycles. The binary signals appearing on the output lines 96 of the counter 86 and representing the current count is transmitted to a combination logic circuit unit 98 (FIGS. 4 and 5) which is logically constructed to output the signal I indicated by the numeral 100 in FIG. 3. As illustrated, the signal I goes high as the output count of the counter 86 reaches a predetermined value and stays high until the output count of the counter 86 reaches a second value, at which time the signal 100 goes low. The time the signal 100 stays high must be selected to correspond to the occurrence of the delayed signal SEC (FIG. 3) generated by the circuit 20 (FIG. 1). As will be discussed more fully hereinafter, the operation of the ROM unit 30 (FIG. 1) is dependent on the delay period T generated by delay circuit 20. As shown in FIG. 5, the combination logic unit 98 in the present embodiment may comprise AND gates 99 arranged as shown to receive the binary bits present in the output lines 96 of the counter 86 (FIG. 4) to output to the OR gate 101 the signal 100 when the output count is between five and fifteen. As further shown in FIG. 3, the signal 100 is arbitrarily indicated as being high between 0.5T to 1.5T from the time the power supply signal $V_{cc}$ went high. The signal I is transmitted over line 102 to the D-input of the flip-flop 90 (FIG. 4). The security check signal SEC appearing on line 28 is also coupled to the clock input of the flip-flop 88 whose D-input is connected to the power supply 27 (FIG. 1) which generates the signal $V_{cc}$.

As shown in FIG. 3, once the signal $V_{cc}$ goes high, the Q output signal SECON of the flip-flop 88 and indicated by the numeral 104 will go high upon the clocking of the flip-flop by the signal SEC. Because the signal $V_{cc}$ will remain high, the signal SECON will stay high even when the signal SEC goes low as indicated by the dotted lines 106 in FIG. 3. This latter condition may occur if the chip select input SEC (FIG. 1) is used in addressing the memory unit 30. The signal SECON is transmitted over line 106 to an edge detector 108 (FIG. 4) which outputs the pulse SECE, indicated by the numeral 110 in FIG. 3, over line 112 to the flip-flop 90 upon sensing the signal SECON going high. The signal SECE will clock the flip-flop 90 allowing the flip-flop to output a high signal 113 (FIG. 3) at its Q output if the signal I appearing at the D-input is high at this time. The high signal 113 appearing on the Q output line 114 of flip-flop 90 (FIG. 4) will enable the input buffer 48 of the ROM memory unit 30 to initiate a memory access operation in accordance with the chip select signals appearing at the chip select input lines 29, 31 (FIG. 1) of the ROM memory unit 30. Once the signal SECE goes high, the flip-flop 90 will be set and remain set until the power is shut off and the flip-flops 88, 90 are reset in the manner described previously.

It will be seen from this construction that once the signal $V_{cc}$ goes high indicating a power-up condition, the delayed security check signal SEC must go high during the time the signal I is high (FIG. 3) in order for the flip-flop 90 to output the high enabling signal 113 to the ROM unit 30. Without the delay, the signal SEC is unlikely to go high when the signal I is high. This results in the signal I being low when the flip-flop 90 is clocked by the signal SECE, which operation prevents any access to the ROM unit 30 by an addressing unit. Thus, the circuit prevents the unauthorized use of the ROM memory unit when removed from the processor for which it was programmed to be part.

While the invention has been particularly shown and described with reference to a preferred embodiment thereof, it will be understood by those skilled in the art that various changes in forms and details may be made therein without departing from the spirit and scope of the invention. Hence, applicants desire their invention to be not limited beyond the scope as required by the appended claims.

I claim:

1. A system for controlling the operation of a memory device comprising;

a memory device (34);

means (27) for generating a first memory operating signal ($V_{cc}$) at the start of operation of said memory device;

first circuit means (20) coupled to said operating signal generating means for generating a delayed signal (SEC) representing said first memory operating signal delayed a first predetermined time period;

first logic means (86, 98) responsive to the generation of said first memory operating signal for generating a first control signal (100) for a second predetermined time period;

and second logic means (88, 108, 90) coupled to said memory device and responsive to the simultaneous occurrence of said delayed signal and said first control signal for generating a second memory operating signal (113) thereby enabling said memory device to be operated.

2. The memory controlling system of claim 1 wherein said first logic means includes counter means (86) responsive to the generation of said first memory operating signal to initiate an output count and third logic means (98) coupled to the output of said counter means for outputting said first control signal in response to the operation of said counter means.

3. The memory controlling system of claim 2 in which said second logic means includes a first bistable device (90) coupled to the output of said third logic means for receiving said first control signal, and said second logic means further includes fourth logic means (88, 108) coupled to said bistable device and operated by said delayed first memory operating signal to output a clocking signal (SECE) to said bistable device whereby said bistable device is activated to output said second memory operating signal.

4. The memory controlling system of claim 3 in which said fourth logic means includes a second bistable device (88) coupled to said first memory signal generating means and said first circuit means to output a second control signal (SECON) upon the occurrence of said delayed signal and detector means (108) coupled to said second bistable device for outputting said clocking signal in response to the output of said second control signal.

5. The memory controlling system of claim 1 which further includes a microprocessor 33 connected to said memory device, said memory device includes a plurality of input ports 49 for receiving signals from said microprocessor during a memory access operation of said memory device, and said first circuit means is connected to one of said ports whereby upon removal of said memory device from association with said microprocessor, said first circuit means is disabled from association with said memory device.

6. The memory controlling system of claim 4 in which said first circuit means comprises an R-C circuit.

7. In a system including an electronic memory unit and a microprocessor to control the reading of or writing of data into said memory unit, a circuit for controlling the operation of the memory unit comprising:

means for generating a memory energizing signal;

first circuit means coupled to said electronic memory unit and said energizing signal generating means for delaying the transmission of said energizing signal to said memory unit a first predetermined time period;

first logic means located within said memory unit coupled to said memory energizing signal generating means for generating a first control signal for a second predetermined time period in response to receiving said memory energizing signal;

second logic means coupled to said first circuit means for outputting a pulse upon receiving said delayed memory energizing signal;

and a first bistable logic device located within said memory unit coupled to said first and second logic means for outputting a second memory energizing signal in response to the simultaneous occurrence of said pulse and said first control signal whereby said memory unit is conditioned for operation.

8. The memory controlling circuit of claim 7 in which said first logic means includes;

reset means coupled to said memory energizing signal generating means for outputting a reset signal in response to the generation of said memory energizing signal;

means for generating a plurality of clock signals;

and counter means coupled to said reset means, and said clock generating means for initiating an output count in response to receiving said reset signals and said clock signals.

9. The memory controlling circuit of claim 8 in which said first logic means further includes third logic means coupled to the output of said counter means for outputting said first control signal for said second predetermined time period.

10. The memory controlling circuit of claim 9 in which said second logic means includes a second bistable device coupled to said memory energizing signal generating means and said first circuit means to output a second control signal in response to the generation of said delayed memory energizing signal, said second logic means further includes edge detector means coupled to said first and second bistable devices and operated in response to generation of said second control signal to output said pulse to said first bistable device.

11. The memory controlling circuit of claim 10 in which said first bistable device comprises a flip-flop having a data input, a clock input and an output, said data input connected to the output of said third logic means and the clock input is connected to the output of said edge detector means whereby said first bistable device will output said second memory energizing signal upon the simultaneous occurrence of said pulse and said first control signal.

12. The memory controlling system of claim 11 in which the memory unit includes a plurality of input ports for receiving memory access signals from the microprocessor, said first circuit means connected to one of said input ports whereby upon removal of said memory unit from association with the microprocessor, said first circuit means is disabled from association with said memory unit.

13. A method for enabling the operation of a memory device comprising the steps of;

generating a first memory energizing signal at the start of the operation of the memory device;

generating a first control signal for a first predetermined time period in response to the generation of said first memory energizing signal;

delaying said first memory energizing signal for a second predetermined time period;

and generating a second memory energizing signal in response to the simultaneous occurrence of said first control signal and said delayed first memory energizing signal whereby said memory device is enabled.

14. A method for enabling the operation of a memory device comprising the steps of;

generating a first memory enabling signal at the start of the operation of the memory device;

locating a signal delay circuit external to the memory device;

transmitting the first memory enabling signal to said signal delay circuit;

generating a delayed memory enabling signal in response to the generation of said first memory enabling signal;

generating a first control signal for a first predetermined time period in response to the generation of said first memory enabling signal;

generating a second memory enabling signal in response to the simultaneous occurrence of said first control signal and said delayed memory enabling signal;

and transmitting said second memory enabling signal to the memory device.

* * * * *

UNITED STATES PATENT AND TRADEMARK OFFICE
CERTIFICATE OF CORRECTION

PATENT NO. : 4,384,326
DATED : May 17, 1983
INVENTOR(S) : Rathindra N. Devchoudhury It is certified that error appears in the above—identified patent and that said Letters Patent is hereby corrected as shown below:

Title page, column 1, line 2 of the title "OCCURANCE"

should be -- OCCURRENCE --.

Column 1, line 2, "OCCURANCE" should be -- OCCURRENCE --.

Signed and Sealed this

Ninth Day of August 1983

[SEAL]

*Attest:*

*Attesting Officer*

GERALD J. MOSSINGHOFF
*Commissioner of Patents and Trademarks*